(12) United States Patent
Lee et al.

(10) Patent No.: US 8,165,526 B2
(45) Date of Patent: Apr. 24, 2012

(54) APPARATUS AND METHOD FOR CONNECTING WIRELESS DEVICES

(75) Inventors: Choong-hun Lee, Yongin-si (KR); Ja-nam Ku, Yongin-si (KR)

(73) Assignee: Samsung Electronics Corporation, Suwon-Si (KR)

( * ) Notice: Subject to any disclaimer, the term of this patent is extended or adjusted under 35 U.S.C. 154(b) by 975 days.

(21) Appl. No.: 12/099,005

(22) Filed: Apr. 7, 2008

(65) Prior Publication Data

US 2009/0111380 A1  Apr. 30, 2009

(30) Foreign Application Priority Data

Oct. 30, 2007 (KR) .................. 10-2007-0109843

(51) Int. Cl.
*H04B 7/00* (2006.01)
(52) U.S. Cl. ............ 455/41.3; 455/41.1; 455/41.2
(58) Field of Classification Search .......... 455/41.1, 455/41.2, 41.3, 66.1, 68, 73, 517
See application file for complete search history.

(56) References Cited

U.S. PATENT DOCUMENTS

| | | | | |
|---|---|---|---|---|
| 7,228,108 B2 * | 6/2007 | Ayatsuka et al. | ............... | 455/73 |
| 7,734,299 B2 * | 6/2010 | Panabaker et al. | ......... | 455/456.1 |
| 2003/0045316 A1 * | 3/2003 | Tjong et al. | .................. | 455/517 |
| 2005/0180545 A1 * | 8/2005 | Bremer | ...................... | 379/22.04 |
| 2008/0166966 A1 * | 7/2008 | Hamasaki et al. | ........... | 455/41.2 |

FOREIGN PATENT DOCUMENTS

| | | |
|---|---|---|
| JP | 11-008625 | 1/1999 |
| JP | 2002-341983 | 11/2002 |
| JP | 2003-179545 | 6/2003 |
| KR | 1020020020643 | 3/2002 |
| KR | 1020060086300 | 7/2006 |
| KR | 1020070009855 | 1/2007 |
| KR | 1020070066025 | 6/2007 |

* cited by examiner

*Primary Examiner* — Tuan H Nguyen
(74) *Attorney, Agent, or Firm* — NSIP Law

(57) ABSTRACT

Provided are a connecting apparatus for a wireless device and a connecting method thereof, more particularly, a connecting apparatus for a wireless device, which exchanges basic information required for establishing a wireless communication channel between wireless devices through a contact surface interface on which the wireless devices physically contact each other, registers the basis information respectively in the wireless devices, and completes setting of a communication protocol while the wireless devices contact each other, and a connecting method thereof. Therefore, since basic information for communications is automatically exchanged between wireless devices and registered respectively in the wireless devices through a contact interface, it is possible to easily and conveniently connect the wireless devices wirelessly.

15 Claims, 6 Drawing Sheets

APPARATUS AND METHOD FOR CONNECTING WIRELESS DEVICES

CROSS REFERENCE TO RELATED APPLICATIONS

This application claims priority from Korean Patent Application No. 10-2007-0109843 filed on Oct. 30, 2007, the disclosure of which is incorporated herein in its entirety by reference.

BACKGROUND OF THE INVENTION

1. Field of the Invention

The present invention relates to an apparatus and method for connecting wireless devices, and more particularly, to an apparatus and method for easily and effectively connecting wireless devices or portable terminals which can perform wireless communications.

2. Description of the Related Art

With rapid development of information communication technologies, various portable, compact wireless devices have been developed. Representative examples of such wireless devices are portable terminals, such as cellular phones, Personal Digital Assistants (PDAs), and Portable Multimedia Players (PMPs), which can receive or transmit information from/to other terminals. In particular, most such wireless devices have been designed to execute various other applications as well as their intended functions in order to satisfy consumers' various requirements. With this trend, a need for connecting wireless devices to each other is increasing.

For example, many cellular phones provide a MP3 player function of playing music. In this case, users can listen to music through a speaker installed in a cellular phone, or through an earphone as necessary. In the case of listening to music through an earphone, the cellular phone should be connected to the earphone.

Conventionally, in view of stability of information transmission, a wired earphone which is put into the cellular phone has been utilized. However, with development of communication technologies, stable transmission of information has become possible without utilizing any physical medium for transferring signals, and a technology of wirelessly connecting an earphone to a cellular phone has been developed. A representative example of wirelessly connecting an earphone to a cellular phone is to utilize a bluetooth earphone and a bluetooth cellular phone.

Wireless connections between devices provide convenience to users, however, there is inconvenience in that extra setting is required to satisfy the characteristics of wireless communications. That is, a wireless communication channel for wireless connections should be established between devices that are to be connected to each other, and a communication protocol, which defines the size of a data packet, a communication method, etc., should be set.

In the case of using the Bluetooth cellular phone and the Bluetooth earphone, users have to manipulate the cellular phone in order to connect the earphone to the cellular phone. In other words, in order to execute a Bluetooth mode, a user manipulates a cellular phone to search for a peripheral Bluetooth device and display the result of the searching, and then, selects and registers an earphone to which he or she wants to connect the cellular phone, while viewing the displayed result.

However, the conventional method is available only when users are aware of the intrinsic information of wireless devices. Also, the conventional method has inconvenience in that users have to input various information required for wireless communications through manipulation of a cellular phone. Particularly, when a user tries to replace an earphone with a different one, he or she should repeat the process described above, which requires a long time and causes inconvenience.

SUMMARY OF THE INVENTION

The present invention provides an apparatus and method for efficiently and easily connecting devices which can perform wireless communications.

The present invention discloses an apparatus and method for connecting devices, by exchanging basic information required for establishing a wireless communication channel between the devices, registering the basic information respectively in the devices, through a contact interface on which the devices physically contact each other, and completing setting of a communication protocol while the devices contact each other.

According to an aspect of the present invention, there is provided a connecting apparatus for a wireless device, including: a contact unit, which another wireless device contacts, providing a communication interface with the other wireless device when the other wireless device contacts the contact unit; a controller receiving basic information for communications stored in advance in the other wireless device from the other wireless device, registering the basis information for communications in the wireless device, and establishing a protocol for wireless communications using the basic information for communications, when the other wireless device contacts the contact unit; and a wireless communication unit transmitting or receiving data to or from the other wireless device according to the protocol.

The basis information for communications is information about a unique identifier or an address of the other wireless device, or a communication protocol that is to be used.

The connecting apparatus further includes a group setting unit generating a group identification code, and transmitting the group identification code to the other wireless device to assign the group identification code to the other wireless device, when the other wireless device contacts the contact unit.

The group setting unit determines whether a different wireless device contacts the contact unit within a predetermined time after the other wireless device are separated from the contact unit, and assigns the group identification code assigned to the other wireless device to the different wireless device if the different wireless device contacts the contact unit within the predetermined time.

The connecting apparatus further includes a testing unit generating a testing signal for determining whether the other wireless device operates normally, and transmitting the testing signal to the other wireless device through the contact unit.

According to another aspect of the present invention, there is provided a method for connecting at least two wireless devices, including: when the at least two wireless devices contact each other, establishing a wired communication channel through contact surfaces on which the at least two wireless devices contact each other; loading basic information for communications stored in advance in the at least two wireless devices, exchanging the basic information for communications between the at least two wireless devices through the wired communication channel, and registering the basis information for communications respectively in the at least two wireless devices; and establishing a protocol for wireless communications using the basis information for communications.

The connecting method further includes generating a group identification code and assigning the group identification code to the at least two wireless devices, when the at least two wireless devices contact each other.

The connecting method further includes: determining whether another wireless device contacts a wireless device of the at least two wireless devices within a predetermined time after the at least two wireless devices are separated from each other; and if the other wireless device contacts the wireless device of the at least two devices within the predetermined time, assigning a group identification code assigned to the at least two wireless devices to the other wireless device.

Additional aspects of the invention will be set forth in the description which follows, and in part will be apparent from the description, or may be learned by practice of the invention.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the aspects of the invention.

DETAILED DESCRIPTION OF EXEMPLARY EMBODIMENTS

Figure 1:
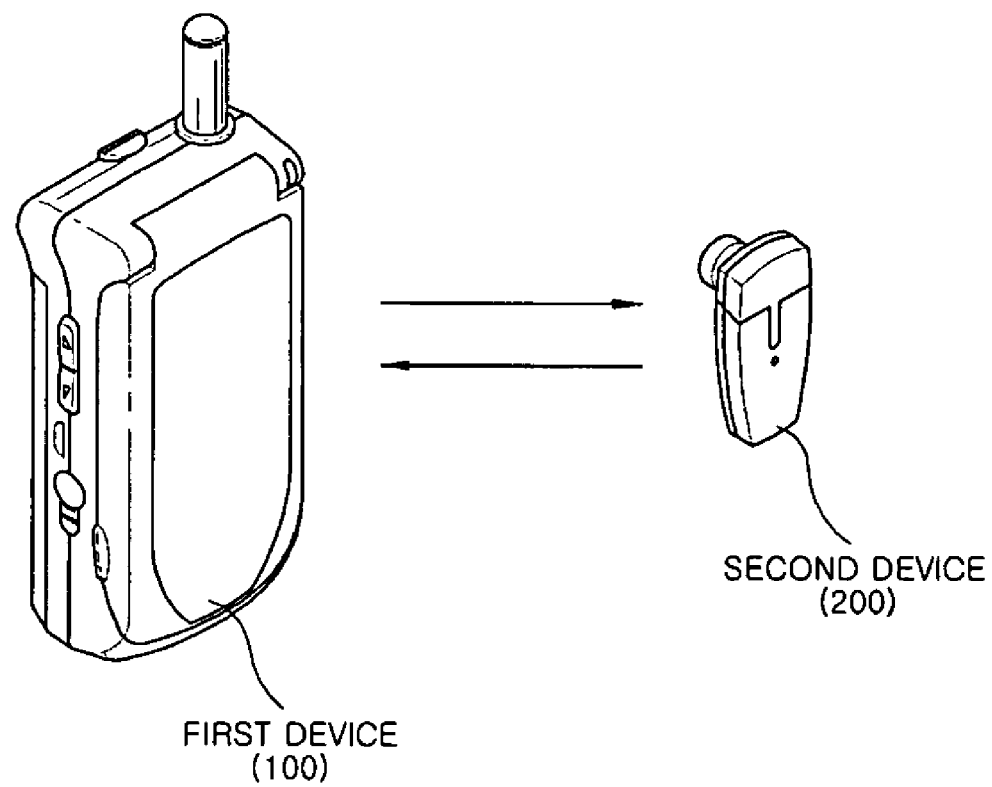
FIG. 1 illustrates wireless devices according to an embodiment of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

FIG. 1 illustrates two wireless devices (referred to as first and second devices 100 and 200) which are connected to each other, according to an embodiment of the present invention.

In FIG. 1, the first and second wireless devices 100 and 200 may be portable terminals allowing wireless communications, for example, cellular phones, Personal Digital Assistants (PDAs), Portable Media Players (PMPs), wireless earphones, wireless headsets, etc. For convenience of description, in FIG. 1, it is assumed that the first device 100 is a cellular phone and the second device 200 is a wireless earphone or a wireless headset.

Recently, many cellular phones provide a function of reproducing predetermined sound resource files, as well as a voice call function, and some users utilize a wireless earphone in order to listen to music which is reproduced by such a cellular phone. Also, some users are talking on a cellular phone using a wireless headset which is wirelessly connected to the cellular phone in order to prevent any accident from occurring when driving a vehicle.

In other words, the first device 100 (for example, a cellular phone) and the second device 200 (for example, a wireless earphone or a wireless headset) can be connected wirelessly to each other as necessary to receive/transmit information from/to each other.

Also, the second device 200 can be mounted on the first device 100. Here, the term "mounting" means that the second device 200 is removably installed in or fixed to the first device 100. For example, in order to mount the second device 200 on the first device 100, the first device 100 has a concave slot which is fitted to the outer shape of the second device 200 so that the second device 200 is inserted into or fixed to the first device 100.

When the second device 200 is mounted on the first device 100, a contact area is formed between the first and second devices 100 and 200. The first and second devices 100 and 200 exchange information required for wireless communications through the contact area, and establish a wireless communication channel. Thereafter, if the second device 200 is separated from the first device 100, the first device 100 communicates wirelessly with the second device 200 through the wireless communication channel.

Accordingly, a user can keep the wireless earphone 200 connected to the cellular phone 100 in usual times, and separate the wireless earphone 200 from the cellular phone 100 when he or she wants to utilize the wireless earphone 200. That is, since various information required for wireless communications is exchanged between the cellular phone 100 and the wireless earphone 200, and a protocol is established when the wireless earphone 200 is mounted on the cellular phone 100, that is, when a contact area is made between the cellular phone 100 and the wireless earphone 200, direct wireless communications between the cellular phone 100 and the earphone 200 are possible without having to perform extra setting after the wireless earphone 200 is separated from the cellular phone 100.

Figure 2:
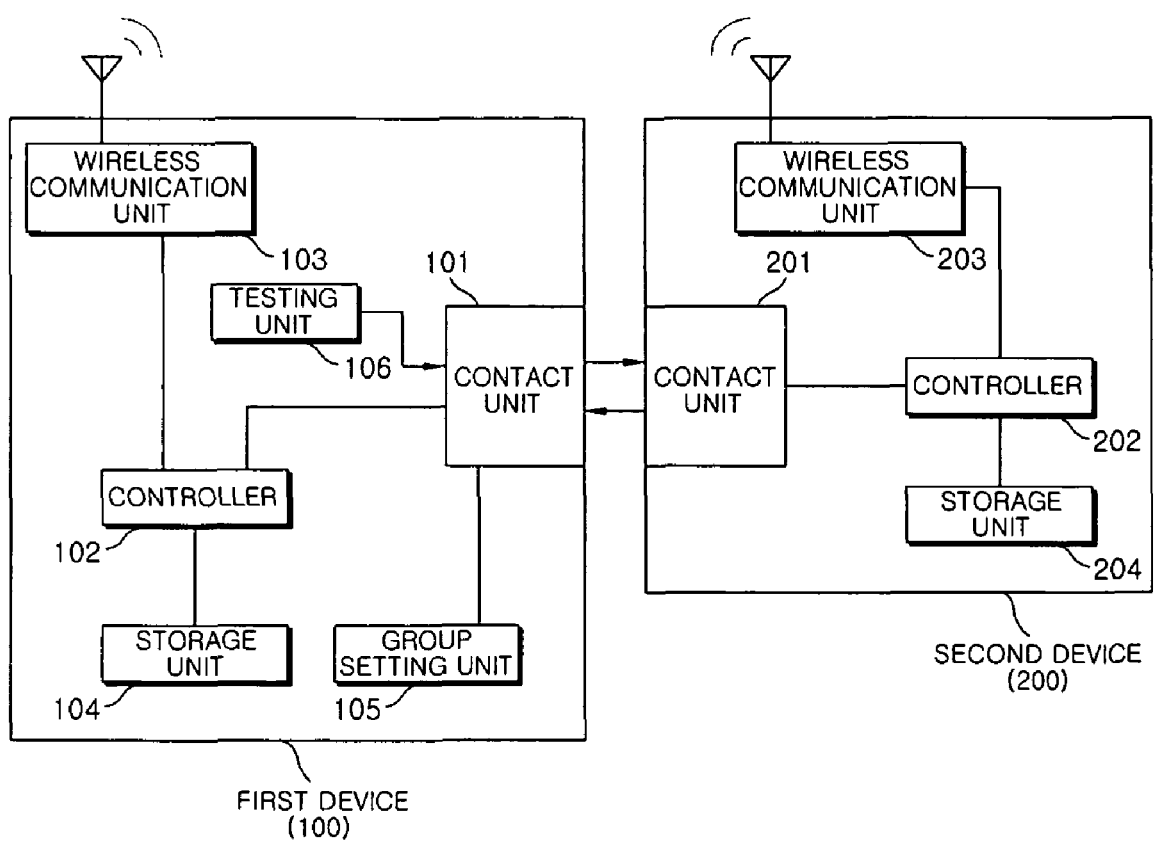
FIG. 2 is a block diagram of a connecting apparatus for a wireless device, according to an embodiment of the present invention.

FIG. 2 is a block diagram of a connecting apparatus for a wireless device, according to an embodiment of the present invention.

Referring to FIG. 2, the apparatus includes a contact unit 101, a controller 102, and a wireless communication unit 103. The apparatus can further include a storage unit 104, a group setting unit 105, and a testing unit 106.

The contact unit 101 provides a communication interface for physically connecting wireless devices 100 and 200 which contact each other. The contact unit 101 may be a plug, a socket, or a contact terminal, which is formed on one side of the wireless device 100 and through which information can be transmitted.

When the wireless device 200 contacts the contact unit 101, the contact unit 101 generates a contact acknowledge signal and transfers it to the controller 102. The controller 102 establishes a wired communication channel or a contact interface in response to the contact acknowledge signal so that information can be received/transmitted through the contact unit 10. Also, if the controller 102 receives the contact acknowledge signal, the controller 102 exchanges basic information for communications between the wireless devices 100 and 200 through the contact unit 101, and registers the basic information for communications received from the wireless device 200.

The basic information for communications means various communication information required for establishing the wireless communication channel, and includes unique identifiers (for example, IDs or serial numbers) or addresses (for example, ip addresses) of the wireless devices 100 and 200, or information about a communication protocol that is to be used. The basic information for communications is stored in advance in the storage unit 104, and the controller 102 loads the basic information for communications stored in the storage unit 104, in response to the contact acknowledge signal received from the contact unit 101.

The basic information for communications is exchanged between the wireless devices 100 and 200, and registered respectively in the wireless devices 100 and 200. For example, if the second device 200 is mounted on or contact the first device 100, basic information for communications of the first device 100 is transmitted to the second device 200, and basic information for communications of the second device 200 is transmitted to the first device 100, so that each of the wireless devices 100 and 200 registers the basic information for communications of the other party therein. That is, the basic information for communications received from the other party is stored in the storage unit 104 so that the basic information for communications can be loaded as necessary.

Also, the controller 102 establishes a protocol for wireless communications using the basic information for communications. The protocol for wireless communications is used to perform wireless communications after the wireless device 100 is separated from the wireless device 200. The protocol for wireless communications corresponds to a wireless communication channel. Also, the protocol for wireless communications can be established by handshaking predetermined data packets including the basic information for communications.

Figure 3:
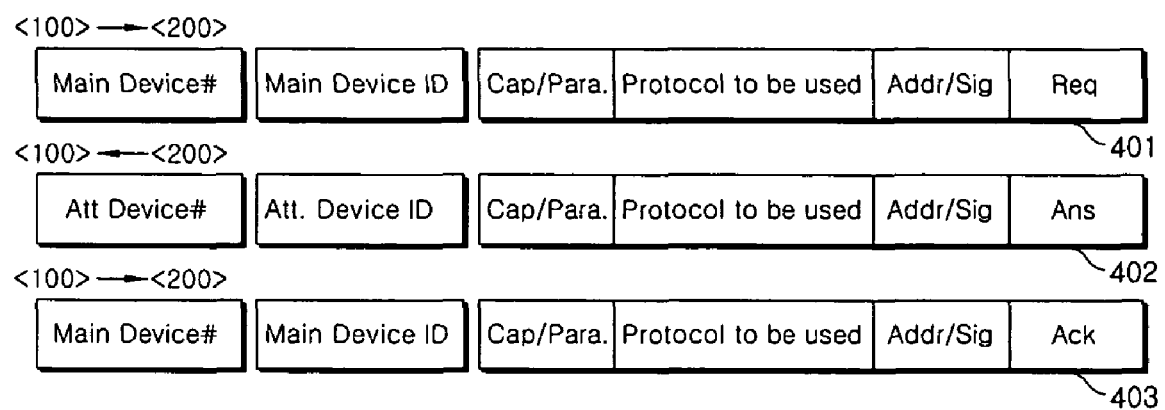
FIG. 3 illustrates data packets which are exchanged when protocol handshaking is performed, according to an embodiment of the present invention.

For example, as illustrated in FIG. 3, protocol handshaking can be performed in which a request message 401, a response message 402, and an acknowledge message 403, each including the basic information for communications, are exchanged sequentially between the first device 100 and the second device 200.

The wireless communication unit 103 receives or transmits data according to the protocol, and allows wireless communications between the wireless devices 100 and 200. For example, the wireless communication unit 103 may be a RF module which receives a data packet based on the protocol format from the controller 102, converts the data packet into an RF signal, and transmits the RF signal to the wireless device 200, or receives an RF signal from the wireless device 200 and converts the RF signal into packet data.

The testing unit 106 generates a testing signal for determining whether the wireless device 200 which contacts the wireless device 100 operates normally, and transmits the testing signal to the wireless device 200 through the contact unit 101. For example, when a wireless earphone (the second device 200) contacts a cellular phone (the first device 100), a predetermined buzzer sound is generated and transmitted to the wireless earphone 200, so that a user determines whether each block operates normally, according to the buzzer sound.

In this structure, since a wireless communication channel is automatically established only by contacting the wireless devices 100 and 200 each other without having to perform extra manipulation, the wireless devices 100 and 200 can be easily connected to each other.

Also, in the current embodiment of the present invention, a method of connecting two wireless devices to each other has been described, however, a method of connecting a wireless device to a group including a plurality of wireless devices is also possible. For example, by connecting three wireless earphones to a cellular phone, group communications can be carried out. Such grouping is performed by the group setting unit 105.

The group setting unit 105 will be described in detail with reference to FIG. 4, below.

Figure 4:
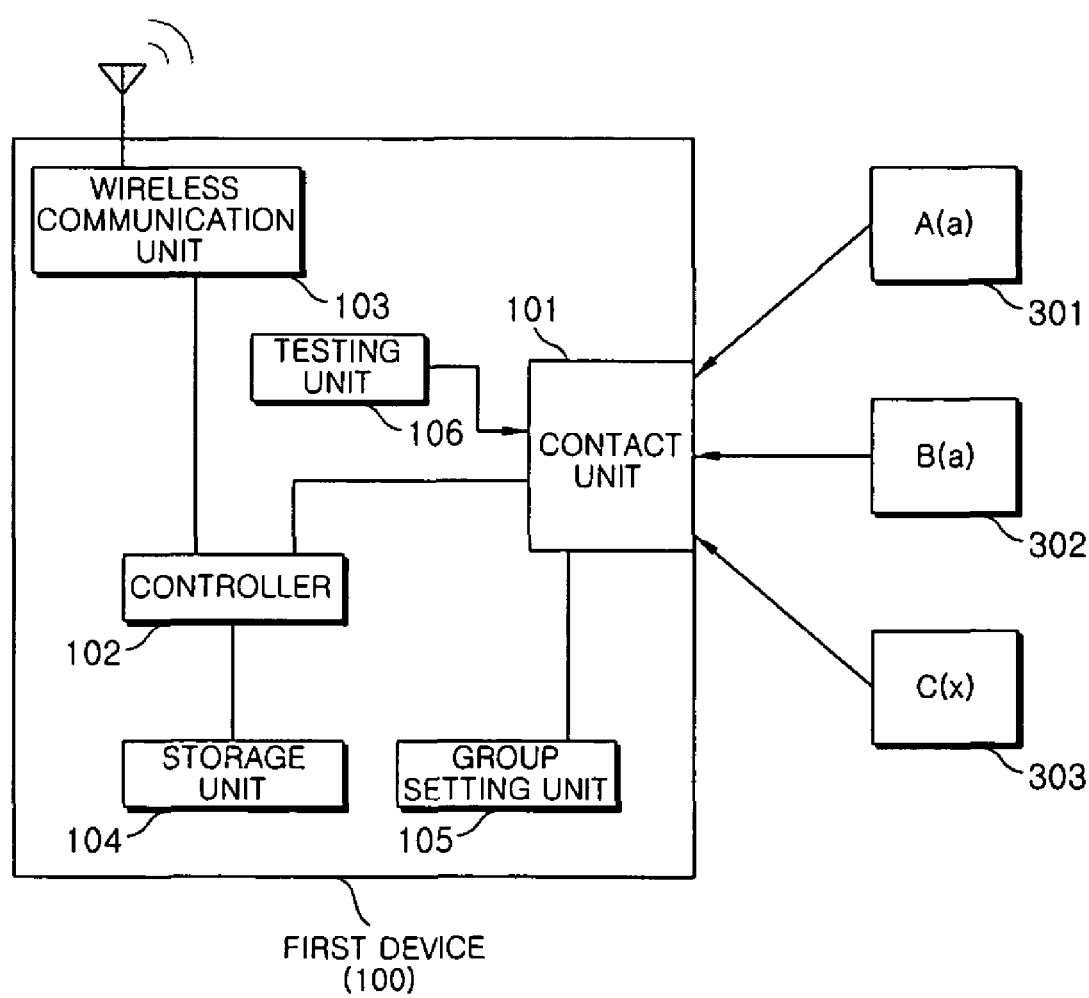
FIG. 4 is a block diagram of a connecting apparatus for a wireless device, according to another embodiment of the present invention.

In FIG. 4, it is assumed that three second devices A, B, and C (301, 302, and 303) are connected to a first device 100. First, if the A device 301 contacts the first device 100, the group setting unit 105 generates a group identification code. Here, the group identification code can be generated arbitrarily by receiving a contact acknowledge signal from a contact unit 101, or can be generated by a user's designation when a group designation command is issued from the user. In the current embodiment of the present invention, when the A device 301 contacts the first device 100, a group identification code "a" is arbitrarily generated.

Also, the group setting unit 105 transmits the group identification code "a" to the A device 301 through the contact unit 101. As described above, if the A device 301 contacts the first device 100, a communication interface is formed by the contact unit 101, and information is exchanged between the A device 301 and the first device 100 through the communication interface. Accordingly, by providing the group identification code "a" to the first device 100 and registering the group identification code "a" in the first device 100 (for example, storing the group identification code "a" in the storage unit 104), the group identification code "a" can be assigned to the A device 301.

If the A device 301 is separated from the first device 100, the group setting unit 105 counts a time which is elapsed until any other wireless device (for example, the B or C device 302 or 303) contacts the first device 100. That is, when the B device 302 contacts the first device 100 after the A device 301 is separated from the first device 100, the group setting unit 105 determines whether a time from when the A device 301 is separated from the first device 100 to when the B device 302 contacts the first device 100 is within a predetermined time. If the B device 302 contacts the first device 100 in the predetermined time, the group identification code "a" which has been assigned to the A device 301 is also assigned to the B device 302.

Likewise, after the B device 302 is separated from the first device 100, the group setting unit 105 determines whether any other wireless device (for example, the C device 303) contacts the first device 100 within a predetermined time. In the current embodiment of the present invention, if the C device 303 does not contact the first device 100 in the predetermined time, no group identification code is assigned to the C device 303. However, assigning a new group identification code (for example, "b") to the C device 303 is also possible.

If group identification codes are assigned to the wireless devices 301, 302, and 303 in the manner described above, the wireless communication unit 103 multiplex-transmits the same data to the wireless devices 301 and 302 to which the same group identification code is assigned, and allows the wireless devices 301 and 302 to perform group communications.

As such, since the same group identification code is assigned to a plurality of wireless devices by contacting the wireless devices each other at predetermined time intervals, the plurality of wireless devices can be easily connected to each other.

Then, a method for connecting wireless devices to each other, according to an embodiment of the present invention, will be described with reference to FIG. 5.

Figure 5:
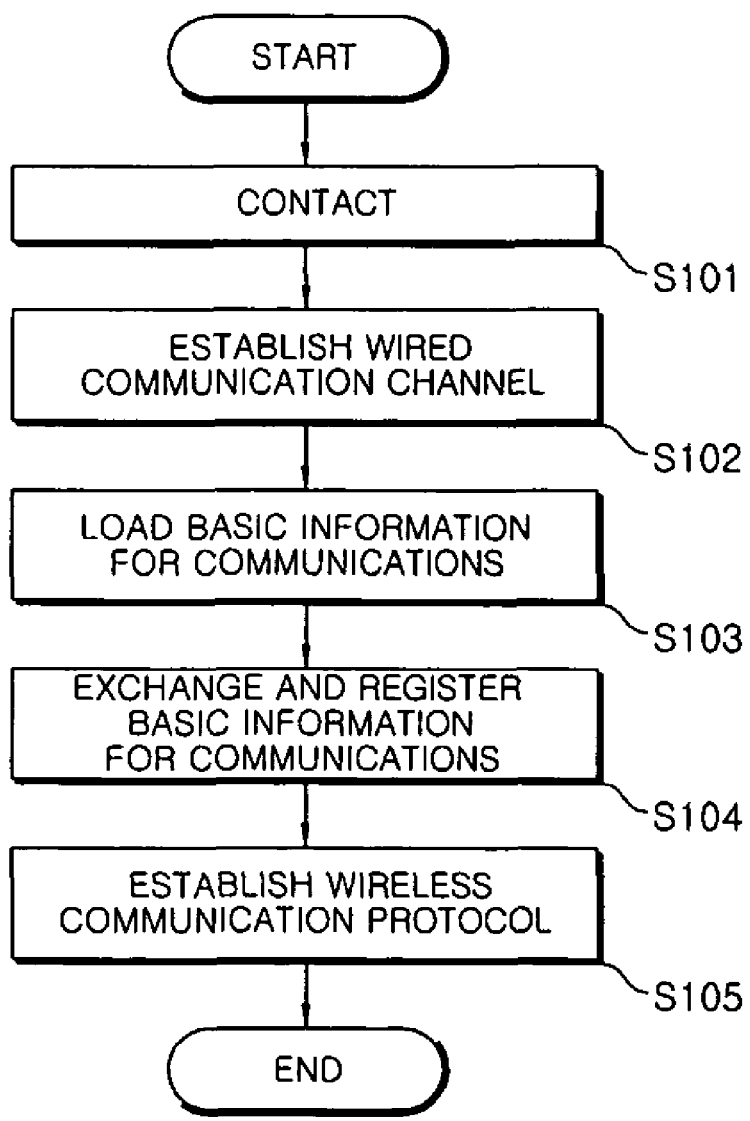
FIG. 5 is a flowchart of a method for connecting wireless devices, according to an embodiment of the present invention.

Referring to FIG. 5, if two wireless devices contact each other (operation S101), a communication interface, that is, a wired communication channel is established through contact surfaces of the wireless devices (operation S102). Successively, basis information for communications, such as unique identifiers (for example, IDs or serial numbers) or addresses (for example, ip addresses) of the wireless devices, or information about a communication protocol that is to be used, is loaded (operation S103). Here, the basic information for communications is stored in advance as described above. Then, the basic information for communications is exchanged between the wireless devices and is registered respectively in the wireless devices through the wireless communication channel which has been established in operation S102 (operation S104). Then, a protocol for wireless communications is set using the basis information for communications (operation S105). The operation S105 of setting the protocol for wireless communications can be performed simultaneously with the operation S104 of exchanging the basic information for communications between the wireless devices. Thereafter, if the wireless devices are separated from each other, the wireless devices can receive or transmit data wirelessly according to the protocol.

Figure 6:
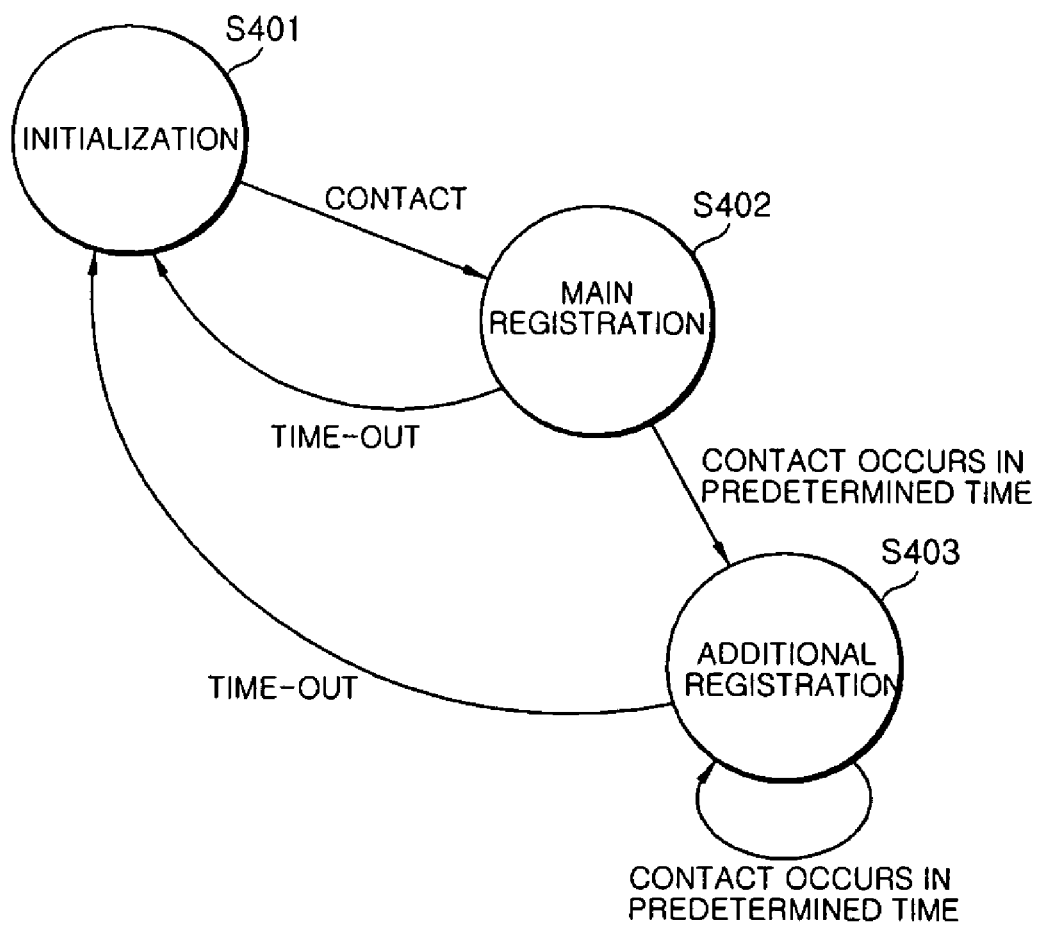
FIG. 6 is a flowchart of a method for connecting wireless devices, according to another embodiment of the present invention.

FIG. 6 is a flowchart of a method for connecting wireless devices after grouping the wireless devices, according to another embodiment of the present invention.

Referring to FIG. 6, if wireless devices contacts each other in an initialized state (operation S401), main registration is performed (operation S402). Here, the term "main registration" means that one of two wireless devices assigns a group identification code to the other one. Thereafter, if the wireless devices are separated from each other and another device contacts one of the wireless devices, it is determined whether the another device contacts the wireless device within a predetermined time, additional registration is performed only if the another device contacts the wireless device within the predetermined time (operation S403), and the process returned to the initialized state (operation S401) if the another device contacts the wireless device after the predetermined time elapses. Here, the term "additional registration" (operation S403) means a process of assigning the same identification code as that assigned in the operation S402 of main registration to a plurality of wireless devices in order to designate the plurality of wireless devices as a group. If another wireless device contacts the wireless device within the predetermined time after the operation S403 of additional registration is performed, additional registration for the another wireless device is again performed (operation S403).

As described above, in an apparatus and method for connecting wireless devices, according to the embodiments of the present invention, since various information is exchanged between the wireless devices and registered in the wireless devices through contact units included in the wireless devices, and a wireless communication protocol is established between the wireless devices using the exchanged information, it is possible to easily connect the wireless devices only by contacting them each other without having to perform any other manipulation. Also, when a plurality of wireless devices are connected to each other, since the wireless devices are designated to the same group and perform group communications only by repeatedly contacting and separating the wireless devices at predetermined time intervals, the wireless devices can be easily connected to each other.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A connecting apparatus for a wireless device, comprising:
    a contact unit configured to provide a communication interface in physical contact with another wireless device when the other wireless device contacts the contact unit, wherein information for wireless communications is transmitted through the contact unit;
    a controller configured to: receive the information from the other wireless device through the contact unit and establish a protocol for wireless communications with the other wireless device using the information, when the other wireless device contacts the contact unit;
    a group setting unit configured to generate a group identification code, and to transmit the group identification code to the other wireless device in order to assign the group identification code to the other wireless device through the contact unit, when the other wireless device contacts the contact unit; and
    a wireless communication unit configured to transmit or receive data to or from the wireless device according to the protocol when the other wireless device is separated from the contact unit, and to perform group communications using the group identification code.

2. The connecting apparatus of claim 1, wherein the information for wireless communications is information about a unique identifier or an address of the other wireless device, or a communication protocol that is to be used.

3. The connecting apparatus of claim 1, wherein the group identification code is generated arbitrarily or by a user's designation.

4. The connecting apparatus of claim 1, wherein the group setting unit is configured to determine whether a different wireless device contacts the contact unit within a predetermined time after the other wireless device are separated from the contact unit, and to assign the group identification code assigned to the other wireless device to the different wireless device if the different wireless device contacts the contact unit within the predetermined time.

5. The connecting apparatus of claim 1, wherein the wireless communication unit is configured to transmit the same data to one or more wireless devices to which the same group identification code is assigned so that the one or more wireless devices perform group communications.

6. The connecting apparatus of claim 1, further comprising a testing unit configured to generate a testing signal in order to determine whether the other wireless device operates normally, and to transmit the testing signal to the other wireless device through the contact unit.

7. The connecting apparatus of claim 1, wherein the contact unit comprises a plug, a socket, or a contact terminal, that is configured to transmit information between the wireless device and the other wireless device.

8. The connecting apparatus of claim 1, wherein the wireless device and the other wireless device are configured to connect to and disconnect from each other.

9. The connecting apparatus of claim 1, wherein the wireless device is a cellular phone, a Personal Digital Assistant (PDA), a Portable Multimedia Player (PMP), a wireless earphone, or a wireless headset.

10. The connecting apparatus of claim 1, wherein a part of the other wireless device is configured to be inserted into or fixed to the contact unit.

11. The connecting apparatus of claim 1, wherein the controller is configured to register the basis information for communications in the wireless device.

12. A method for connecting at least two wireless devices, the method comprising:
when the at least two wireless devices contact each other, establishing a wired communication channel through contact surfaces on which the at least two wireless devices contact each other;
loading information for wireless communications stored in advance in the at least two wireless devices, and exchanging the information between the at least two wireless devices through the contact surfaces;
establishing a protocol for wireless communications using the basis information for communications;
generating a group identification code and assigning the group identification code to the at least two wireless devices through the contact surfaces, when the at least two wireless devices contact each other; and
performing group communications using the group identification code,
when the at least two wireless devices are separated from each other, performing wireless communications based on the established protocol.

13. The connecting method of claim 12, wherein the information for communications comprises information about unique identifiers or addresses of the at least two wireless devices, or a communication protocol that is to be used.

14. The connecting method of claim 12, wherein the generating and assigning of the group identification code comprises
determining whether another wireless device contacts a wireless device of the at least two wireless devices within a predetermined time after the at least two wireless devices are separated from each other; and
if the other wireless device contacts the wireless device of the at least two devices within the predetermined time, assigning a group identification code assigned to the at least two wireless devices to the other wireless device.

15. The connecting method of claim 12, further comprising: registering the information respectively in the at least two wireless devices.

* * * * *